(12) United States Patent
Toimil Molares et al.

(10) Patent No.: US 12,176,476 B2
(45) Date of Patent: Dec. 24, 2024

(54) POROUS ETCHED ION-TRACK POLYMER MEMBRANE AS A SEPARATOR FOR A BATTERY

(71) Applicants: Centre national de la recherche scientifique, Paris (FR); UNIVERSITE DE PICARDIE JULES VERNE, Amiens (FR); GSI HELMHOLTZZENTRUM FÜR SCHWERIONENFORSCHUNG GmbH, Darmstadt Allemagne (DE); Technische Universität Darmstadt, Darmstadt Allemagne (DE)

(72) Inventors: Maria Eugenia Toimil Molares, Seeheim-Jugenheim (DE); Christina Trautmann, Darmstadt (DE); Pui Lap Jacob Lee, Darmstadt (DE); Mathieu Morcrette, Amiens (FR)

(73) Assignees: Centre national de la recherche scientifique, Paris (FR); UNIVERSITE DE PICARDIE JULES VERNE, Amiens (FR); GSI HELMHOLTZZENTRUM FÜR SCHWERIONENFORSCHUNG GmbH, Darmstadt Allemagne (DE); Technische Universität Darmstadt, Darmstadt Allemagne (DE)

( * ) Notice: Subject to any disclaimer, the term of this patent is extended or adjusted under 35 U.S.C. 154(b) by 655 days.

(21) Appl. No.: 16/622,102

(22) PCT Filed: Jun. 14, 2018

(86) PCT No.: PCT/EP2018/065901
§ 371 (c)(1),
(2) Date: Dec. 12, 2019

(87) PCT Pub. No.: WO2018/229235
PCT Pub. Date: Dec. 20, 2018

(65) Prior Publication Data
US 2020/0136115 A1 Apr. 30, 2020

(30) Foreign Application Priority Data
Jun. 14, 2017 (EP) ..................................... 17305729

(51) Int. Cl.
*H01M 10/052* (2010.01)
*B01D 67/00* (2006.01)
*B01D 71/02* (2006.01)
*H01M 50/403* (2021.01)
*H01M 50/414* (2021.01)
*H01M 50/451* (2021.01)
*H01M 50/489* (2021.01)

(52) U.S. Cl.
CPC ...... *H01M 10/052* (2013.01); *B01D 67/0032* (2013.01); *B01D 67/0088* (2013.01); *B01D 71/024* (2013.01); *H01M 50/414* (2021.01); *H01M 50/451* (2021.01); *H01M 50/489* (2021.01); *B01D 2325/021* (2013.01); *H01M 50/403* (2021.01)

(58) Field of Classification Search
None
See application file for complete search history.

(56) References Cited

U.S. PATENT DOCUMENTS

| | | | |
|---|---|---|---|
| 6,447,943 | B1 | 9/2002 | Peled et al. |
| 6,908,552 | B2 | 6/2005 | Siwy et al. |
| 2003/0159985 | A1 | 8/2003 | Siwy et al. |
| 2012/0189917 | A1 | 7/2012 | Heusser-Nieweg et al. |
| 2014/0272286 | A1 | 9/2014 | Stoltenberg et al. |
| 2015/0280192 | A1* | 10/2015 | Lee ..................... H01M 50/403 429/246 |
| 2016/0294000 | A1 | 10/2016 | He et al. |
| 2017/0141397 | A1 | 5/2017 | Lecuyer et al. |

FOREIGN PATENT DOCUMENTS

| | | |
|---|---|---|
| CN | 102598359 A | 7/2012 |
| CN | 104756284 A | 7/2015 |
| CN | 105489818 A | 4/2016 |
| EP | 2 897 197 A1 | 7/2015 |
| JP | 2014-113734 A | 6/2014 |
| KR | 10-2014-0070466 A | 6/2014 |
| WO | 2014084684 A1 | 6/2014 |

OTHER PUBLICATIONS

Apel, P. Y., et al. "Fabrication of nanopores in polymer foils with surfactant-controlled longitudinal profiles" Nanotechnology 18(305302):1-7 ( 8 pages submitted) (2007).
Bai, S., et al. "Metal-organic framework-based separator for lithium-sulfur batteries" Nature Energy 16094:1-6 (7 pages submitted) (Jun. 27, 2014).
Balach, J., et al. "Improved cycling stability of lithium-sulfur batteries using a polyproplyene-supported nitrogen-doped mesoporous carbon hybrid separator as polysulfide adsorbent" Journal of Power Sources 303:317-324 (9 pages submitted) (2016).
Bauer, I., et al. "Reduced polysulfide shuttle in lithium-sulfur batteries using Nafion-based separators" Journal of Power Sources 251:417-422 (2014).
Choi, Y., et al. "Improvement of cycle property of sulfur electrode for lithium/sulfur battery" Journal of Alloys and Compounds 449:313-316 (2008).

(Continued)

*Primary Examiner* — Robert S Carrico
(74) *Attorney, Agent, or Firm* — TROUTMAN PEPPER HAMILTON SANDERS LLP

(57) ABSTRACT

The present invention relates to the use of a porous polymer etched ion-track membrane as separator for batteries comprising a positive electrode, a negative electrode and a liquid electrolyte comprising at least one salt of a cationic ion in solution in a solvent, and to batteries comprising such a membrane as porous separator.

15 Claims, 8 Drawing Sheets

(56) References Cited

OTHER PUBLICATIONS

Ji, X., et al. "A highly ordered nanostructured carbon-sulfur cathode for lithium-sulphur batteries" Nature Materials 8:500-506 (May 17, 2009).
Toimil-Morales, M. E., "Characterization and properties of micro- and nanowires of controlled size, composition, and geometry fabricated by electrodeposition and ion-track technology" Beilstein Journal of Nanotechnology 3:860-883 (2012).
Trautmann, C., et al. "Micro-and Nanoengineering with Ion Tracks" Ion Beams in Nanoscience and Technology, Particle Acceleration and Detection 369-387 (2009).
European Search Report issued in corresponding European Patent Application No. EP 17 30 5729 dated Jul. 21, 2017.
International Search Report issued in corresponding International Application No. PCT/EP2018/065901 dated Jul. 27, 2018.

* cited by examiner

POROUS ETCHED ION-TRACK POLYMER MEMBRANE AS A SEPARATOR FOR A BATTERY

CROSS REFERENCE TO RELATED APPLICATIONS

This is a U.S. National Phase Application under 35 U.S.C. § 371 of International Patent Application No. PCT/EP2018/065901, filed Jun. 14, 2018, which claims priority of European Patent Application No. 17305729.0, filed Jun. 14, 2017. The entire contents of which are hereby incorporated by reference.

FIELD OF THE INVENTION

The present invention relates to the field of batteries operating by circulation of cationic ions (in particular $Li^{++}$, $Na^+$, $K^+$ and $Ca^{++}$) between a positive electrode and a negative electrode separated by a liquid electrolyte, and more particularly to lithium-sulfur (Li—S) batteries having high energy and power densities, Lithium-Air (Li-Air or Li—$O_2$), Lithium-ion (Li-ion) and sodium-ion (Na-ion) batteries. In particular, the present invention relates to the use of a porous polymer etched ion-track membrane as separator for a battery having a liquid electrolyte and operating by circulation of cationic ions, to a separator for such a battery comprising at least such a membrane, and to a battery having a liquid electrolyte and operating by circulation of cationic ions comprising such a membrane as porous separator.

BACKGROUND

Lithium batteries have become essential constituents in numerous devices which can comprise portable appliances, such as in particular mobile telephones, computers and lightweight equipment, or heavier appliances, such as two-wheel transportation means (bicycles, mopeds) or four-wheel transportation means (electric or hybrid motor vehicles). They are also widely studied for use in the field of stationary energy storage.

SUMMARY

A lithium battery comprises at least one negative electrode and at least one positive electrode, between which is placed a solid electrolyte or a separator impregnated with a liquid electrolyte. The negative electrode consists of a sheet of lithium metal or of lithium alloy or an intercalation compound such as graphite and/or silicon, optionally supported by a current collector, and the positive electrode consists of a current collector supporting an electrode material containing at least one positive electrode active material capable of reversibly inserting lithium ions, optionally a polymer which acts as binder (e.g. poly(vinylidene fluoride) or PVdF) and/or optionally an agent which confers electron conductivity (e.g. carbon). The liquid electrolyte for example consists of a lithium salt in solution in a solvent chosen in order to optimize the transportation and the dissociation of the ions. The separator has, for its part, to ensure perfect isolation between the two electrodes in order to prevent any risk of short circuit. It is thus made of porous material which does not conduct electrons, generally made of polymer (e.g. polyethylene) material or made of fibres (e.g. glass fibres or wood fibres), and has to have:

an appropriate mechanical strength, in order to withstand the stresses due to the variations in volume of the active materials during the charging and discharging cycles, a sufficient chemical resistance, in order to ensure that it holds over time since it is immersed in a highly corrosive solution (i.e. electrolyte), and an appropriate porous structure, in order to make possible the diffusion of the anions and cations of the electrolyte and to prevent any transportation of active material from one electrode to the other.

The general denomination of Lithium batteries encompasses notably Lithium-ion, Lithium-Air and Lithium-sulfur batteries.

Sodium-ion batteries are a cost-effective alternative to lithium especially for applications where weight and energy density are of minor importance such as grid energy storage for renewable energy sources such as wind and solar power. Moreover, Sodium-ion batteries have excellent electrochemical features in terms of charge-discharge, reversibility, coulombic efficiency and high specific discharge capacity. As lithium batteries, they comprise at least one negative electrode and at least one positive electrode, between which is placed a solid electrolyte or a separator impregnated with a liquid electrolyte comprising a sodium salt in solution in a solvent. As Na-ion negative electrode, carbon is the most attractive together with the use of Na-alloys. The positive electrode consists of a current collector supporting an electrode material containing at least one positive electrode active material capable of reversibly inserting sodium ions such as polyanionic compounds such as $NaFePO_4$, $Na_3V_2(PO_4)_2F_3$, $Na_2Fe_2(SO_4)_3$, $Na_3V_2(PO_4)_3$ or layered compounds such as Na-based nickel manganese cobalt oxide phases (NMC phases), optionally a polymer which acts as binder and/or optionally an agent which confers electron conductivity.

Potassium-batteries are a type of battery analogue to lithium-ion batteries, using potassium ions for charge transfer instead of lithium ions. Along with sodium-ion battery, potassium-ion battery is the prime candidate to replace lithium-ion batteries. The potassium battery has certain advantages over similar lithium batteries (e.g., lithium-ion batteries): the cell design is simple and both the material and the fabrication procedure are cheaper. The key advantage is the abundance and low cost of potassium in comparison with lithium, which makes potassium batteries a promising candidate for large scale batteries such as household energy storage and electric vehicles.

Calcium ion batteries attracted much attention as next generation to replace Lithium-ion batteries because the theoretical capacity is twice that of the Li-ion batteries. This doubled capacity can be explained by the difference between monovalent and divalent ions. In addition, Ca-ion batteries possess advantages such as lower cost and higher safety because Ca is far more abundant than lithium and because Ca ion batteries have a higher melting point that Li-ion batteries. Researchers focus now on a suitable electrode material in which Ca ions can be inserted and extracted reversibly because of the relatively large ionic radius of Ca ions.

During the operation of the battery, cationic ions pass from one to the other of the electrodes through the electrolyte. During discharging of the battery, an amount of cationic ions reacts with the positive electrode active material from the electrolyte and an equivalent amount is introduced into the electrolyte from the active material of the negative electrode, the concentration of cationic ions thus remaining constant in the electrolyte. The insertion of the cationic ions into the positive electrode is compensated for by supplying electrons from the negative electrode via an external circuit. During charging, the reverse phenomena takes place.

The various constituents of a battery are chosen so as to produce, at the lowest possible cost, batteries which have a high energy density, which have a good cycling stability and which operate with safety.

One of the most promising systems for the electrochemical storage of energy is the lithium-sulfur battery, on the one hand because elemental sulfur $S_8$ is an abundant, economical and nontoxic element and, on the other hand, because this material exhibits a high theoretical specific capacity and a high theoretical energy density by weight, respectively of 1675 mAh/$g_{sulfur}$ and 2600 Wh/$kg_{sulfur}$, if the elemental sulfur $S_8$ is completely reduced to lithium sulphide $Li_2S$ at a voltage of close to 2 volts (with respect to the $Li^+/Li^0$ pair). By comparison, the energy densities by weight currently obtained for the best Li-ion batteries are 200-250 Wh/kg, 100-150 Wh/kg for a Na-ion battery and 50 Wh/kg for a redox-flow battery. It is thus possible to hope to achieve energy densities of the order of 500 Wh/kg for a lithium-sulfur (i.e. Li/S) battery, which is comparable to the values obtained for Li-air batteries.

A lithium-sulfur battery generally comprises a metal negative electrode (i.e. anode) composed of lithium or of a lithium-based alloy or of an intercalation compound such as graphite, a positive electrode (i.e. cathode) generally porous carbon comprising sulfur, a sulfur-comprising organic compound as active material or $Li_2S$, and a separator generally composed of a porous membrane of polyolefins (e.g. polyethylene, polypropylene) which is impregnated by a liquid electrolyte comprising at least one lithium salt, or a polymer electrolyte ensuring, by itself, both the physical separation of the electrodes and the transportation of the lithium ions.

However, potential commercialization of lithium-sulfur batteries is hindered by several problems. One of them is known as the polysulfide redox shuttle. At the positive pole, the reduction of the sulfur by the lithium results in the formation of negatively charged polysulfides which are soluble in the majority of ordinary liquid electrolytes. The polysulfides diffuse through the separator towards the negative electrode, where they are reduced to lower polysulfides and are then transported back to the positive pole. The reduction of the polysulfides also results at the negative pole in the formation of a layer of insoluble $Li_2S$ or of insoluble $Li_2S_2$ on the lithium metal. As this layer is dense and electrically insulating, it results in the passivation of the negative electrode and the blocking of the electrochemical reactions. As the intermediate lithium polysulfides $Li_2S_n$ (2<n<8) can react with the negative electrode, they also promote the self-discharge. In addition, they are responsible for the installation of a shuttle mechanism which takes place in charging and which results in the deterioration of the performance levels of the battery, in particular in terms of coulombic efficiency.

Different solutions have been proposed so far to remedy this problem. In particular, considerable efforts have been devoted to designing porous composite positive electrodes that are capable of delivering electrons efficiently to the sulfur as well as trapping the soluble polysulfides. Most of the approaches have involved the fabrication of disordered mesoporous carbon-sulfur composites (Choi, Y-J. et al., J. Alloy Compd., 2008, 449, 313-316) or more recently ordered nanostructured mesoporous carbon-sulfur composites, optionally functionalizing the pore surfaces of carbon with polyethyleneglycol to further delay the diffusion of polysulfides out of the cathode structure (Nazar, L. F. et al., Nature Mater., 2009, 8, 500-506).

Parallelly, only limited research has been carried out on the separator. Up to relatively recently, the role of the separator had been mainly to insulate cathode and anode without influencing the transport of ions through the membrane.

As a first example, I. Bauer et al., (Journal of Power Sources, 2014, 251, 417-422), have proposed to use Nafion® coated polypropylene separator (Celgard® 2500) as cation-selective membrane for lithium-sulfur battery to suppress the polysulfide shuttle. However, this type of separator is not a selective porous membrane for lithium ions, it is a highly solvating polymer for lithium ions and a poorly solvating polymer for polysulfides. Its use is not totally satisfying as its performances decrease along with the life time of the battery, in particular with high loads of Nafion® which lead to an increase of polarization and failure of the battery after a few cycles.

As a second example, S. Bai et al., (Nature Energy, June 2016, DOI: 10.1038/nernergy.2016.94) have proposed a graphene oxide metal (CuII)) organic framework-based ionic sieve functioning as a battery separator to selectively sieve lithium ions while blocking polysulfides. This metal organic framework separator has a three-dimensional channel structure containing highly ordered micropores with a size window of approximately 9 angstroms, which is significantly smaller than the diameter of lithium polysulfide. However, even if this separator demonstrated high efficiency in blocking polysulfides and very good stability over long-term cycling in a lithium-sulfur battery, its use at the industrial scale is not possible since the preparation of graphene oxide is very expensive.

As a third example, J. Balach et al., (Journal of Power Sources, 2016, 303, 317-324), have proposed a polypropylene-supported nitrogen-doped mesoporous carbon hybrid separator as polysulfides adsorbent in lithium-sulfur battery. The dopants present on this separator chemically bond to the polysulfides, preventing their diffusion towards the negative lithium electrode. However, this method is limited by the number of dopants available at the surface of the separator to chemically bind polysulfides and not fully appropriate for reducing effectively the polysulfide shuttle in lithium-sulfur batteries comprising a positive electrode having a high content in sulfur.

As lithium-sulfur batteries, the other types of batteries operating by circulation of cationic ions ($Na^+$, $K^+$ and $Ca^{++}$) between a positive electrode and a negative electrode separated by a liquid electrolyte, also suffer from the damages generated by the circulation of redox species between the positive and the negative electrodes (redox shuttle phenomenon) and which leads in many cases to the self-discharge of batteries. Redox shuttle phenomenon could be defined as the migration of one or several redox species from one electrode to the other electrode of the battery, one of these species being first obtained from undesired parasitic reactions between one electrode and the electrolyte of the battery.

The aim of the present invention is to overcome the disadvantages of the abovementioned prior art and to develop an economical and efficient separator able to suppress or at least reduce the redox shuttle phenomenon, in particular the polysulfides shuttle, in batteries operating by circulation of cationic ions ($Li^{++}$, $Na^+$, $K^+$ and $Ca^{++}$) between a positive electrode and a negative electrode separated by a liquid electrolyte, and in particular in lithium-sulfur batteries. The aim of the present invention is also to provide an economical battery, in particular a lithium-sulfur battery, a Lithium-Air battery, a Lithium-ion battery or sodium-ion battery, with improved electrochemical performance levels, in particular in terms of stability of cycling and of Coulombic efficiency.

This aim is achieved by the invention which will be described below.

A first subject-matter of the invention is the use of a porous polymer etched ion-track membrane as a separator in battery comprising at least one positive electrode, at least one negative electrode and at least one liquid electrolyte comprising at least one salt of a cationic ion selected in the group consisting of lithium, sodium, potassium and calcium in solution in at least one solvent, wherein:
- said polymer is selected from the group comprising polyethyleneterephtalate (PET), polycarbonate (PC), polyethylene (PE), polypropylene (PP), polyimide (PI) polytetrafluoroethylene (PTFE), and polyvinylidene fluoride (PVdF),
- said membrane has a frontside, a backside, and a thickness,
- the frontside of said membrane is designed to face the positive electrode,
- the backside of said membrane is designed to face the negative electrode,
- the thickness of said membrane between said frontside and said backside is ranging from about 5 to 60 µm,
- said membrane comprises a plurality of nanochannels,
- the majority in number of said nanochannels is continuous and has an opening tip at the frontside and an opening tip at the backside of said membrane,
- the opening tip diameter of each of said nanochannels at the frontside of said membrane ($D_{FS}$) ranges from about 10 to 200 nm,
- the opening tip diameter distribution of the nanochannels at the front side and at the back side is narrow.

According to the invention, the expression "the majority in number of said nanochannels is continuous" means that at least 80%, preferably at least 90% and even more 100% of the nanochannels are continuous.

According to the invention, the expression "the opening tip diameter distribution of the nanochannels at the front side and at the back side is narrow" means that on each side of the membrane, all nanochannels of the membrane have approximately the same opening tip diameter, i.e. the same diameter ±0-10% preferably ±0-5%.

Thanks to this membrane used as a separator in batteries operating by circulation of cationic ions, it is now possible to allow the flux of cationic ions while suppressing or at least highly reducing the redox shuttle phenomenon, in particular the polysulfides shuttle, between the positive and negative electrodes and hence increasing the coulombic efficiency of the battery while maintaining a competent capacity performance.

In addition, the use of this membrane as separator in said batteries offers several additional important advantages:
i) Etched ion-track polymer membranes consist of a single type polymer. Its preparation is relatively simple and cost effective as it does not need any mixture of expensive materials;
ii) Etched ion-track polymer membrane synthesis is reproducible and scalable;
iii) the nanochannel density, their diameter and geometry can all be independently controlled to a high degree of precision relative to typical separators used in batteries,
iv) the membrane is flexible and therefore compatible with batteries which are in the form of an assembly of thin films wound (winding of the following pattern {electrolyte/cathode/collector/cathode/electrolyte/anode/collector/anode} over n turns,
v) it represents a long-term solution to suppress or at least greatly reduce the polysulfide shuttle during cycling of lithium-sulfur batteries.

The thickness of said membrane preferably ranges from about 5 to about 30 µm, and even more preferably from about 10 to 20 µm. This is because the membrane must not be too thin, in order to exhibit good mechanical strength and electrochemical behaviour during the cycling, to avoid short circuits and to accommodate a sufficient amount of electrolyte. However, it must not be too thick, otherwise the battery will be penalized in terms of energy densities by weight and by volume (mass effect).

According to a preferred embodiment of the invention, the opening tip diameter of each of said nanochannels at the frontside of the membrane is ranges from about 50 nm to 150 nm, and more preferably from 70 nm to 120 nm. According to the present invention, the expression centered around about 70 nm means a value of 70 nm±7 nm, for example 70 nm±5 nm.

The opening tip diameter of each of said nanochannels at the backside of the membrane ($D_{BS}$) may range from about 10 nm to 600 nm. Indeed, $D_{BS}$ can be identical or different, in particular greater or smaller, than the opening tip diameter of each of said nanochannels at the frontside of the membrane because what is important is that the transport of redox species, and in particular of polysulfide anions, be blocked at the frontside of the membrane designed to face the positive electrode.

According to a first embodiment of the present invention, the opening tip diameter of each of said nanochannels at the backside of the membrane ($D_{BS}$) is substantially identical to the opening tip diameter of each of said nanochannels at the frontside of the membrane ($D_{FS}$) and ranges from about 50 to 150 nm, and more preferably from about 70 to 120 nm. In that case, said nanochannels have a cylindric shape and their longitudinal axis are substantially parallel oriented to one another.

According to a particular embodiment, nanochannels which exhibit a cylindrical shape can further be interconnected.

According to a second embodiment of the present invention, the opening tip diameter of each of said nanochannels at the backside of the membrane ($D_{BS}$) is greater or smaller than the opening tip diameter of each of said nanochannels at the frontside of the membrane ($D_{FS}$) and ranges from about 10 nm to 600 nm. In that case, said nanochannels have a conical shape and their longitudinal axis are substantially parallel oriented to one another.

Among the different polymers mentioned above for the polymer membrane, polyethyleneterephtalate is particularly preferred.

The porosity of the membrane, i.e. the ratio of the total volume of the nanochannels/total volume of the membrane ranges from 2 to 50%, and more preferably from 10 to 30%

The nanochannels density in said membrane preferably ranges from about to $10^6$ to $10^{12}$ nanochannels/cm$^2$, preferably from about $10^7$ to $10^{10}$ nanochannels/cm$^2$, and even more preferably can be close or equal to $10^9$ nanochannels/cm$^2$ of surface membrane.

According to a particular embodiment of the present invention, at least one of the surfaces of the porous membrane, in particular the surface designed to face the positive electrode, comprises a coating of at least one layer of oxide of a metal or of a metalloid, said oxide being preferably chosen from $TiO_2$, $SiO_2$ and $Al_2O_3$. The thickness of said coating may range from about 1 nm to 50 nm, and preferably between 10 nm and 20 nm inclusive. According to this embodiment, the modification of the surface of the membrane by such a coating allows for a further tailoring and control over the diameter of nanochannels by applying a conformal layer of deposited oxide, not only on the surface of the membrane, but also with the pores. It also may confer additional properties to the pores, such as increased chemical resistance and also provides a layer to prevent interaction between the electrolyte and the dangling bonds present on etched nanochannel walls. A surface coating of at least one layer of oxide of a metal or of a metalloid also changes the chemical properties of the membrane surface, which affects the interaction with the polysulfides and ions.

According to a particular embodiment of the present invention, the porous membrane is inserted between two microporous polymer supports, such as for example polyolefins films (e.g. polyethylene, polypropylene). In that case, each of the microporous polymer support may have a thickness ranging from about 5 µm to 50 µm, preferably from about 8 µm to 40 µm and more preferably from about 8 µm to 30 µm.

The membrane used according to the first object of the present invention can be easily prepared by swift heavy ion irradiation and subsequent chemical etching according to the methods well known in the art and described for example by Trautmann C. ("*Ion Beams in Nanoscience and Technology*", Berlin, Heildelberg: Springer Berlin Heildelberg, 2010) in the case of cylindrical nanochannels and as another example in U.S. Pat. No. 6,908,552 in the case of conical nanochannels. Briefly, the method consists in irradiating a polymer foil with swift heavy ions (such as Au, Pb, or U) to produce ions tracks; etching the ion tracks of the foil with an etching solution (such as e.g. NaOH); and stopping the etching operation with a stopping liquid (such as e.g. deionized water), such that the nanochannels are formed.

When the membrane is surface modified, i.e. when it further comprises a layer of an oxide of a metal or of a metalloid, said layer is preferably deposited by atomic layer deposition (ALD which is a reactive vapour surface deposition method well known in the art, whereby a series of reactants are introduced one after another to produce surface reactions that form a layer on the substrate. The first reactant gas in introduced into the reaction chamber, which adheres to the surface of the substrate to be modified (here the polymer membrane), the chamber is then purged. A second reactant gas is then flowed into the chamber, which reacts with the first reactant layer on the substrate, forming the desired material. The chamber is purged again. This process forms a single molecular layer and is repeated until the desired thickness is formed. ALD thus allows for extremely precise thickness control of the deposited material, down to the monolayer level. Precursors must be suitably volatile, and reactive only to each other in the reactions to prevent undesired side reactions. As an example, to deposit a layer of $TiO_2$, titanium isopropoxide (TTIP) may be used as precursor.

A second object of the present is a separator for a battery comprising at least one positive electrode, at least one negative electrode and at least one separator impregnated by a liquid electrolyte comprising at least one salt of a cationic ion selected in the group consisting of lithium, sodium, potassium and calcium in solution in at least one solvent, wherein said separator is a porous polymer etched ion-track membrane such as described in the first object.

According to a preferred embodiment of the present invention, said membrane is inserted between two microporous polymer supports, such as for example polyolefins films (e.g. polyethylene, polypropylene). In that case, each of the microporous polymer support may have a thickness ranging from about 5 µm to 50 µm, preferably from about 8 µm to 40 µm and more preferably from about 8 µm to 30 µm.

Any details and embodiments described hereabove regarding the membrane used according to the first object of the present invention apply to the second object of the present invention.

As already mentioned, the use of said membrane is particularly advantageous as a separator in batteries comprising a liquid electrolyte and operating by circulation of cationic ions, in particular in lithium-sulfur batteries.

Therefore, a third object of the present invention is a battery comprising at least a negative electrode, a positive electrode, a liquid electrolyte comprising at least one salt of a cationic ion selected in the group consisting of lithium, sodium, potassium and calcium in solution in at least one solvent, and a porous separator, wherein said porous separator comprises a porous polymer etched ion-track membrane as described in the first object of the invention.

In particular:
said polymer is selected from the group comprising polyethyleneterephtalate (PET), polycarbonate (PC), polyethylene (PE), polypropylene (PP), polyimide (PI), polytetrafluoroethylene (PTFE), and polyvinylidine fluoride (PVdF),
said membrane has a frontside, a backside, and a thickness,
the frontside of said membrane is designed to face the positive electrode,
the backside of said membrane is designed to face the negative electrode,
the thickness of said membrane between said frontside and said backside is ranging from about 5 to 60 µm,
said membrane comprises a plurality of nanochannels,
the majority in number of said nanochannels is continuous and has an opening tip at the frontside and an opening tip at the backside of said membrane,
the opening tip diameter of each of said nanochannels at the frontside of said membrane ($D_{FS}$) ranges from about 10 to 200 nm,
the opening tip diameter distribution of the nanochannels at the front side and at the back side is narrow.

Any details and embodiments described hereabove regarding the membrane used according to the first object of the present invention apply to the third object of the present invention.

The battery of the invention exhibits noteworthy electrochemical performance levels in terms of energy density by volume and of stability of the specific capacity during the discharge over a large number of cycles, which makes it possible to believe that the diffusion of the polysulfides is suppressed or at least greatly limited.

The porous membrane used in battery of the invention makes it possible not only to ensure the electrical separation of the electrodes but also to prevent or reduce the redox shuttle phenomenon, in particular the polysulfides shuttle when the battery is a lithium-sulfur battery, between the positive electrode and the negative electrode while guaranteeing good electrochemical performance levels, in particular in terms of stability in cycling.

As mentioned above, said battery is preferably a lithium-sulfur battery, a Lithium-Air battery, a Lithium-ion battery, or a sodium-ion battery, the lithium-sulfur battery being even more preferred.

The battery in accordance with the invention can operate between 0 and 110° C. approximately and preferably between 20 and 100° C. approximately.

When the battery according to the invention is a lithium-sulfur battery, the solvent of the liquid electrolyte is a non-aqueous liquid solvent chosen among linear and cyclic polyethers, such as dimethylether (DME), dioxolane (DOL), tetraethylene glycol dimethyl ether (TEGDME), and mixture thereof.

According to a preferred embodiment of the invention, the non-aqueous liquid solvent is a mixture of tetraethylene glycol dimethyl ether and dioxolane.

The lithium salt present in the non-aqueous electrolyte can be chosen from lithium fluorate ($LiFO_3$), lithium bis(trifluoromethanesulphonyl)imide (LiTFSI), lithium hexafluorophosphate ($LiPF_6$), lithium fluoroborate ($LiBF_4$), lithium metaborate ($LiBO_2$), lithium perchlorate ($LiClO_4$), lithium nitrate ($LiNO_3$), lithium bis(fluorosulphonyl)imide (LiFSI) and their mixtures.

LiTFSI is the preferred lithium salt.

As already mentioned, the electrolyte of the lithium-sulfur battery of the invention is non-aqueous, that is to say that it thus does not comprise water or aqueous solvents. This is because an aqueous electrolyte is not compatible with a negative electrode made of lithium metal.

The electrolyte preferably does not comprise organic solvents of carbonate type, it being possible for the latter to react with the polysulfides formed during the cycling.

As the electrolyte is a liquid, it then completely soaks the polymer porous etched ion-track membrane, and optionally the additional side microporous polymer supports, in order to impregnate the porosity thereof.

The concentration of the lithium salt in the liquid electrolyte preferably ranges from about 0.8 to 8 mol/l approximately and more preferably from about 1 to 5 mol/l.

When the battery is a lithium-sulfur battery, the positive electrode is preferably a composite material comprising at least one carbon material, sulfur or a sulfur-comprising compound having at least one S—S bond or $Li_2S$, and at least one polymer binder.

In a specific embodiment of the invention, the positive electrode of the lithium-sulfur battery of the invention comprises from about 20 to 50% by weight of sulfur (S) and preferably from about 25 to 35% % by weight of sulfur (S), with respect to the total weight of said positive electrode.

The sulfur-comprising organic compound can be chosen from organic polysulfides, in particular those of general formula $R^1$—S—$S_n$—$R^2$ in which $R^1$ and $R^2$, which are identical or different, represent a linear, branched or cyclic alkyl chain which can comprise from 1 to 20 carbon atoms, n being between 1 and 50, and disulphide polymers exhibiting a sequence of S—S bonds which can be broken during the discharging cycle of a lithium-sulfur battery and reformed during the charging cycle.

The sulfur-comprising agent is preferably elemental sulfur $S_8$. This is because the latter confers, on the lithium-sulfur battery, a greater energy density due to its high storage capacity by weight.

In the lithium-sulfur battery of the invention, the carbon material can represent from about 50 to 70% by weight, preferably from about 55 to 65% by weight, with respect to the total weight of the positive electrode.

The carbon material is preferably mesoporous carbon.

In addition to the carbon material, the positive electrode of the lithium-sulfur battery may further comprise a conductive agent to enhance the conductivity and which may be chosen from carbon black (carbon Super-P), sp carbon, carbon Super-P, acetylene black, carbon fibres and nanofibres, carbon nanotubes, graphene, graphite, metal particles and fibres and one of their mixtures. Among these carbon-comprising agent, carbon black is particularly preferred.

When present, the conductive agent represents from about 5 to 15% by weight and preferably from about 8 to 12% by weight, with respect to the total weight of the positive electrode.

According to a specific embodiment, the positive electrode of the lithium-sulfur battery according to the invention comprises from about 5 to 15% by weight of polymer binder and preferably from about 8 to 12% by weight of polymer binder, with respect to the total weight of the positive electrode.

The polymer binder can be chosen from copolymers of ethylene and of propylene, or a mixture of at least two of these polymers; homopolymers and copolymers of ethylene oxide (e.g. PEO, copolymer of PEO), of methylene oxide, of propylene oxide, of epichlorohydrin or of allyl glycidyl ether, or their mixtures; halogenated polymers, such as homopolymers and copolymers of vinyl chloride, of vinylidene fluoride (PVdF), of vinylidene chloride, of ethylene tetrafluoride or of chlorotrifluoroethylene, copolymers of vinylidene fluoride and of hexafluoropropylene (PVdF-co-HFP) or their mixtures; polyacrylates, such as polymethyl methacrylate; polyalcohols, such as polyvinyl alcohol (PVA); electron-conducting polymers, such as polyaniline, polypyrrole, polyfluorenes, polypyrenes, polyazulenes, polynaphthalenes, polyacetylenes, poly(p-phenylene vinylene), polycarbazoles, polyindoles, polyazepines, polythiophenes, poly(p-phenylene sulphide) or their mixtures; polymers of cationic type, such as polyethyleneimine (PEI), polyaniline in the emeraldine salt (ES) form, poly(quaternized N-vinylimidazole), poly(acrylamide-co-diallyldimethylammonium chloride) (AMAC), carboxymethylcellulose (CMC), and one of their mixtures.

A polymer of cationic type (i.e., positively charged) makes it possible to improve the retention of the polysulfides, which are negatively charged, in the positive electrode and thus also limit the diffusion of the polysulfides into the electrolyte during the cycling.

The polymer binder is preferably vinylidene fluoride (PVdF), a copolymer of vinylidene fluoride and of hexafluoropropylene (PVdF-co-HFP), carboxymethylcellulode, or one of their mixtures.

The positive electrode of the lithium-sulfur battery of the invention can exhibit a porosity of 10 to 60% by volume approximately and preferably of 20 to 40% by volume approximately, with respect to the total volume of the electrode. This thus makes it possible to improve the energy density of the battery.

It should be noted that the total weight of the positive electrode of the lithium-sulfur battery of the invention comprises the weight of the sulfur-comprising agent, the weight of the polymer binder, the weight of the carbon-comprising agent generating an electron conductivity.

The positive electrode of the lithium-sulfur battery of the invention can be prepared according to the methods well known in the art, such as:

a) by mixing at least one sulfur-comprising agent with at least one carbon-comprising agent and at least one polymer binder, and at least one solvent for the polymer binder in order to prepare an electrode paste, for example by extrusion or by grinding, b) by applying said electrode paste to at least one support, for example by laminating or by coating, c) by drying said electrode paste at a temperature sufficient to make it possible to remove the solvent of stage a), in order to obtain a positive electrode in the form of a supported film.

The solvent of the polymer binder of stage a) makes it possible to dissolve said polymer binder and to obtain a paste.

The solvent of stage a) can be chosen from water, N-methylpyrrolidone, solvents of carbonate type, such as ethylene carbonate, propylene carbonate, dimethyl carbonate, diethyl carbonate or ethyl methyl carbonate, acetone, alcohols, such as methanol, ethanol or propanol, and their mixtures.

The solvent is preferably chosen from water, acetone, alcohols and their mixtures.

The support can be a current collector and/or a support film.

Mention may be made, as example of current collector, of a current collector made of aluminium covered with a carbon-based layer (corrosion-resistant layer).

Mention may be made, as example of support film, of a plastic film of silicone-treated polyethylene terephthalate (PET) type.

The positive electrode supported film of the lithium-sulfur battery according to the invention obtained at the conclusion of stage c) can have a thickness ranging from 2 to 100 µm approximately and preferably from 10 to 60 µm.

The battery as defined in the third object of the invention, can be prepared by: stage a) assembling the positive electrode, the negative electrode and the polymer porous etched ion-track membrane as described in the first object of the present invention, said membrane being optionally inserted between tow microporous polymer supports, and stage b) by impregnation of the assembly resulting from stage a) by the liquid electrolyte.

The present invention is illustrated by the examples below, to which, however, it is not limited.

DETAILED DESCRIPTION

EXAMPLES

Figure 1:
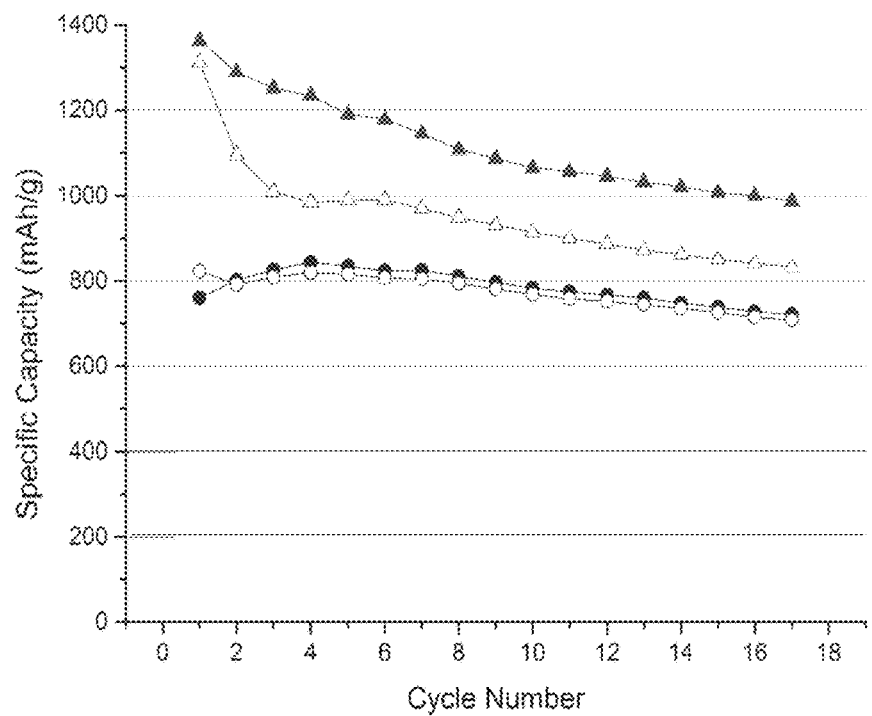
FIG. 1 gives the results of specific capacity (mAh/g) as a function of cycle number for the batteries B1 and B4.

Example 1: Preparation of a PET Porous Etched Ion-Track Membrane According to the Invention, Optionally Comprising a Surface Layer of $TiO_2$ 1.1. Swift Heavy-Ion Irradiation A PET foil has been irradiated by Au-ion at the Universal Linear Accelerator (or UNILAC) of the GSI Helmholtz Centre for Heavy Ion Research in Darmstadt, Germany. The main branch of this apparatus consists of two ion source terminals followed by a Radio Frequency Quadrupole and by an Interdigital linac IH linac accelerator resonating at 36 MHz up to the energy of 11.4 MeV per nucleon (MeV/u) corresponding to approximately 15% of the velocity of light. The main part then is operated by a classical linac of the Alvarez type which resonates at 108 MHz. Final energy adjustment can be performed in the last section consisting of a series of single-gap resonators. Ion beams of such high energy have a penetration range in polymers of about 120 µm. Given this large range, foil stacks (e.g., ten foils 12 µm thick, or four foils 30 µm thick) can be irradiated. Each ionic projectile induces electronic excitation and ionisation processes in a cylindrical zone along its trajectory. In polymers, chemical bonds are destroyed and small volatile fragments (e.g., $H_2$, CO, $CO_2$, hydrocarbons) easily outgas. This damaged region is called the ion track and has a typical diameter of few nanometres.

By suitable adjustment of the ion beam and monitoring the flux (beam current), the applied ion fluence can be adjusted over a wide range, from exposure to a single ion (single track) up to more than $10^{12}$ ions/cm$^2$. At the UNILAC beamline of the GSI facilities, irradiation with a broad homogenous beam is obtained by magnetic defocusing. Samples of up to several square centimetres in size can be exposed. The resulting ion tracks are stochastically distributed and oriented in parallel across the sample. The ions are registered either by a three-foil detector or by a solid-state particle detector placed behind the sample. As soon as the given detector has registered the desired number of ion impacts, the entire ion beam is deflected by an electrostatic chopper system. This can go down to the detection of single ion impacts (Toimil-Molares M. E., Beilstein Journal of Technology, 2012, 3, 860-883, see in particular FIG. 1).

In practice, circular PET foils having the following dimensions: thickness: 19 µm; diameter: 30 mm, were exposed to 11.4 MeV/u Au ions at the X0 beamline of the UNILAC accelerator for about 10 seconds.

Other ions such as Bismuth ions, Uranium ions or also lighter ions like Xenon ions can equally be used to produce a polymer foil having ion tracks.

1.2. Chemical Etching

After the irradiation process, the irradiated PET foils were chemically etched by immersion in an etching solution to selectively dissolve the ion tracks and subsequently enlarge them into nanochannels.

In practice, the irradiated PET foils obtained at the end of step 1.1. were exposed to UV light and subsequently immersed in a 6M NaOH solution at 50° C. for various times to obtain membranes with nanochannels with diameter varying between about 115 to about 198 nm.

The diameter of the nanochannels increases as a function of the immersion time is given in the following Table 1:

TABLE 1

| Membrane | Immersion time (in min) | Diameter of the nanochannels (in nm) | Number of nanochannel/cm$^2$ |
|---|---|---|---|
| M1 | 3.5 | 115 | 10$^9$ |
| M2 | 4.5 | 161 | 10$^8$ |
| M3 | 5.5 | 198 | 10$^8$ |
| M5 | 3.5 | 115 | 10$^7$ |
| M6 | 3.5 | 115 | 10$^8$ |
| M7 | 4.5 | 161 | 10$^7$ |
| M8 | 4.5 | 161 | 10$^9$ |
| M9 | 5.5 | 198 | 10$^9$ |

At the end of the chemical etching process PET porous etched ion-track membranes having the following characteristics were obtained:
thickness: 19 μm
shape of the nanochannels: cylindrical
opening tip diameter of each of said nanochannels at the frontside of about 115 nm for membranes M1, M5 and M6, 161 nm for membranes M2, M7 and M8; and 198 nm for membranes M3 and M9 respectively,
opening tip diameter of each of said nanochannels at the backside: of about 115 nm for membranes M1, M5 and M6, 161 nm for membranes M2, M7 and M8; and 198 nm for membranes M3 and M9.

1.3. Surface Modification by ALD

Membrane M3 obtained at step 1.2. has then been coated by a layer of TiO$_2$ by ALD, using a Picosun R-200 ® Basic flow-type reactor. The precursors used were titanium isopropoxide (Ti(OCH(CH$_3$)$_2$)$_4$, TTIP) and water, forming a TiO$_2$ layer at the end of each cycle. The temperature was held at 110° C. to prevent the condensation of H$_2$O. Nitrogen gas (N$_2$) was used for the purging gas, at a flow rate of 120 sccm. Each cycle consists of the following:
1. A 2 s pulse of TTIP
2. 50 s of N$_2$ purging
3. A pulse H$_2$O pulse with N$_2$ carrier gas at 200 sccm for 0.4 s
4. 50 s of N$_2$ purging This process led to a layer of TiO$_2$ having a thickness of about 20 nm onto the surface of the polymer membrane M3 which results in a final nanochannel diameter of about 160 nm. This membrane was denominated M3-TiO$_2$.

All the porous membranes prepared in this example can then been used as a separator in batteries operating by circulation of cationic ions, in particular in a lithium-sulfur battery as described in the following example.

Example 2: Preparation of a Lithium-Sulfur Battery Using the PET Porous Ion-Track Membrane of Example 1 as Separator 2.1. Preparation of the Positive Electrode Composite Mesoporous carbon: MC and sulfur have first been heat-treated under 300° C. and 60° C. respectively for 24 hours under vacuum to remove any moisture present. The two treated materials were then mixed in a MC to sulphur 50:50 weight percentage mixture, ground in a mortar, and heated in a sealed flask to impregnate the MC with the sulphur, at 155° C. for 6 hours, with a slow 0.5° C. per minute ramp. A slurry composed of the carbon-sulphide composite (80 w %), carbon Super-P (10 w %), and poly (vinylidene fluoride-hexafluoropropylene) (PVdF-HFP) (10 w %), in 40% of dry acetone was made and casted over a thin aluminium foil (15 μm). Carbon Super-P is used to increase the surface area of the composite, while PVdF-HFP is a binder for the slurry. The foil has then been cut into 8 mm diameter circular discs for later integration into coin cells for testing. Each disc contained 0.5 mg of sulfur.

2.2. Assembly of the Lithium-Sulfur Battery

A drying pre-treatment has then first been applied to some of the different parts of the battery in order to remove all moisture from the following materials:
2 Celgard® separators in the form of discs having a diameter of 12 mm and a thickness of 10 μm,
PET porous etched ion-track membranes M1, M2 and M3-TiO$_2$ as prepared in Example 1, cut into 13 mm discs, and
the positive electrode composite, cut into a 11 mm disc.

This pre-treatment has been carried out for 24 hours at 70° for the Celgard® separator and PET porous etched ion-track membranes and for 12 hours at 60° C. in vacuum for the carbon-sulphur positive electrode composite.

A battery B1 in accordance with the present invention was then assembled in a coin cell as follows.

Membranes were transferred from a sealed vacuum sealed chamber to the glove box without exposure to air. The layers are placed one atop another in the stainless steel coin cell top lead in the quick succession: stainless steel spring, stainless steel current collector with lithium foil (thickness: 100 μm, diameter: 11 mm) pressed onto it, first Celgard® separator, 5 μl drop of an electrolyte composition E1 comprising 1M LiTFSI in a mixture of TEGDME/DOL (1:1 by volume), PET porous etched ion-track membrane M1 of example 1, second Celgard® separator, 5 μL drop of the electrolyte composition E1, carbon-sulphur composite positive electrode, stainless steel current collector, and finally, the stainless steel bottom lead. The cell is then pressed together to seal it completely. The cell has immediately been transferred for battery cycling tests.

A second coin cell, identical to B1, but using the membrane M2 prepared hereabove at example 1), step 1.2., has also been assembled according to exactly the same process. This cell was denominated B2.

A third coin cell, identical to B1, but using the membrane M3-TiO$_2$ prepared hereabove at example 1), step 1.3., has also been assembled according to exactly the same process. This cell was denominated B3.

On a comparative purpose, a battery B4 not forming part of the present invention was also assembled according to the same process except that the battery B4 did contain only one Celgard® separator and no PET porous etched ion-track membrane of example 1.

2.3. Battery Cycling Tests

The batteries B1, B2, B3 and B4 were tested by galvanostatic cycling with potential limitation (GCPL), being the limiting reduction and oxidation potentials 1.5 V and 3.0 V, respectively. A given current value was imposed on the batteries, but limiting the potential for both charge and discharge.

The rate used was C10, meaning that the discharge of the batteries occurs over a period of 10 hours. A constant temperature of 20° C. was utilized. Due to the standardized 0.5 mg of sulfur content per cell, 0.0419 mA was imposed on the cell for charge and discharge at C/20, in accordance with the calculated theoretical capacity of the cell. For clarity, only the first few curves will be presented in the annexed FIGS. 1 and 2.

FIG. 1 gives the results of specific capacity (mAh/g) as a function of cycle number. On FIG. 1, the curve with filled triangles corresponds to the charge capacity of battery B4 not forming part of the present invention, the curve with empty triangles correspond to the discharge capacity of the battery B4, the curve with filled circles corresponds to charge capacity of the battery B1 in accordance with the present invention and the curve with empty circles corresponds to the discharge capacity of the battery B1.

Figure 2:
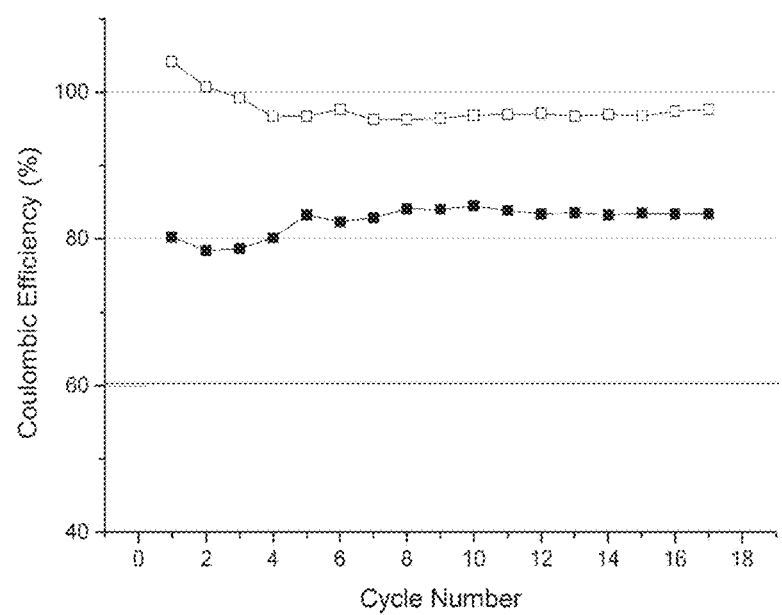
FIG. 2 gives the results of Coulombic Efficiency (%) as a function of cycle number for the batteries B1 and B4.

FIG. 2 gives the results of Coulombic Efficiency (%) as a function of cycle number for the battery B4 not forming part of the present invention (empty squares) and for the battery B1 in accordance with the present invention (filled squares).

These results show that the coulombic efficiency of the battery B1 according to the present invention, i.e. comprising the PET porous etched ion-track membrane M1 of example 1, is 97% compared to 83% for the battery B4 not forming part of the present invention because not comprising such a PET porous etched ion-track membrane. This indicates a sharp reduction of the shuttle redox reactions within the cell with the use of the membrane.

Figure 3:
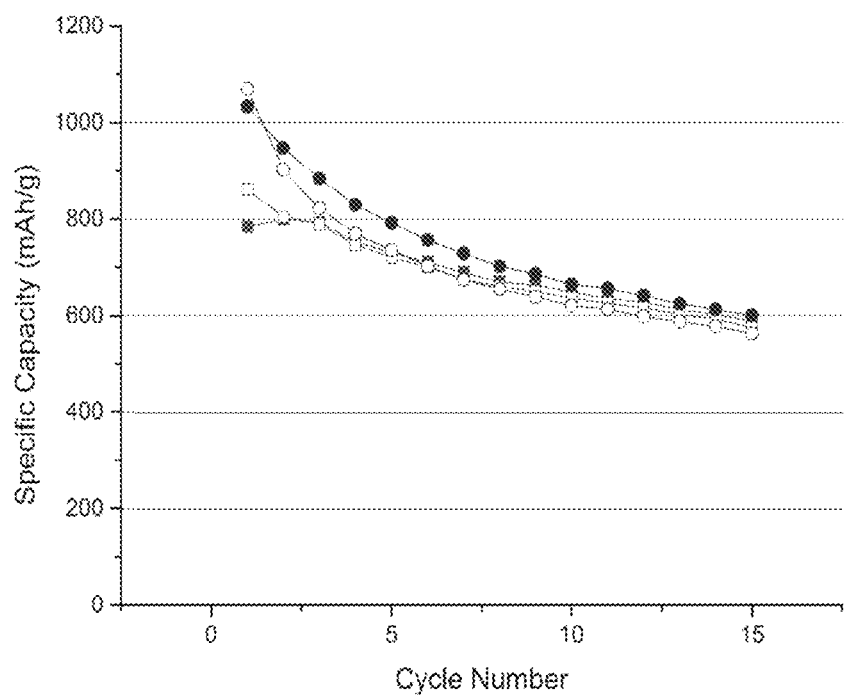
FIG. 3 gives the results of specific capacity (mAh/g) as a function of cycle number for the batteries B2 and B3.

FIG. 3 gives the results of specific capacity (mAh/g) as a function of cycle number. On FIG. 3, the curve with filled circles corresponds to the charge capacity of battery B2 according to the present invention but having no $TiO_2$ coating layer, the curve with empty circles corresponds to the discharge capacity of said battery B2, the curve with filled squares corresponds to charge capacity of the battery B3 in accordance with the present invention having a $TiO_2$ coating layer and the curve with empty squares corresponds to the discharge capacity of said battery B3.

Figure 4:
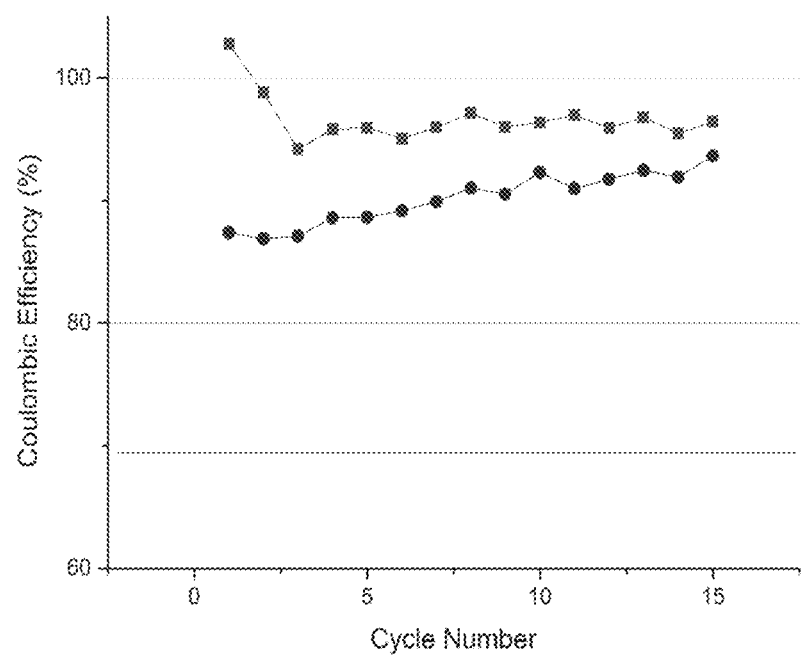
FIG. 4 gives the results of Coulombic Efficiency (%) as a function of cycle number for the batteries B2 and B3.

FIG. 4 gives the results of Coulombic Efficiency (%) as a function of cycle number for the battery B2 of the present invention but having no $TiO_2$ coating layer (filled circles) and for the battery B3 in accordance with the present invention having a $TiO_2$ coating layer (filled squares).

Data presented on FIG. 4 show a clearly higher coulombic efficiency for the cell B3 with $TiO_2$ coated channels at approximately 95%, while the cell B1 with the non-coated sample gave 90-92%.

Without willing to be bound by any theory, the Inventors think that the combined use of $TiO_2$ and nanochannel membranes might have created a tandem effect of some surface adsorption of the polysulphides and filtering by the nanochannels.

Example 3: Comparative Study of Coin-Cell Type Battery Cycling Tests Comprising Different Membranes with Cylindrical Pores 3.1. Preparation of the Membranes and of the Coin Cells Membranes M5-M9 were prepared as described in example 1. The irradiated PET foils (thickness 19 μm or 12 μm when the pores are cylindrical) were exposed to UV light (312 nm wavelength) for three hours on each side, and subsequently immersed in a 6M NaOH solution at 50° C. for various times to obtain membranes with nanochannels with diameter varying between about 115 to about 198 nm.

Coin cells were prepared as described in example 2. The cell comprises 20 ul of electrolyte per mg of active material, and thus 10 ul of electrolyte per cell.

3.2. Battery Cycling Tests

The batteries were tested by galvanostatic cycling with potential limitation (GCPL), being the limiting reduction and oxidation potentials 1.5 V and 3.0 V, respectively. Upon reaching 1.5V, the battery is considered completely discharged, and upon reaching 3.0V, the battery is considered completely charged, regardless of time elapsed. A given current value was imposed on the batteries, but limiting the potential for both charge and discharge.

The rate used was C10, meaning that the discharge of the batteries occurs over a period of 10 hours. A constant temperature of 20° C. was utilized. Due to the standardized 0.5 mg of sulfur content per cell, 0.0419 mA was imposed on the cell for charge and discharge at C/20, in accordance with the calculated theoretical capacity of the cell.

The results are presented on FIGS. 5-10.

Figure 5A:
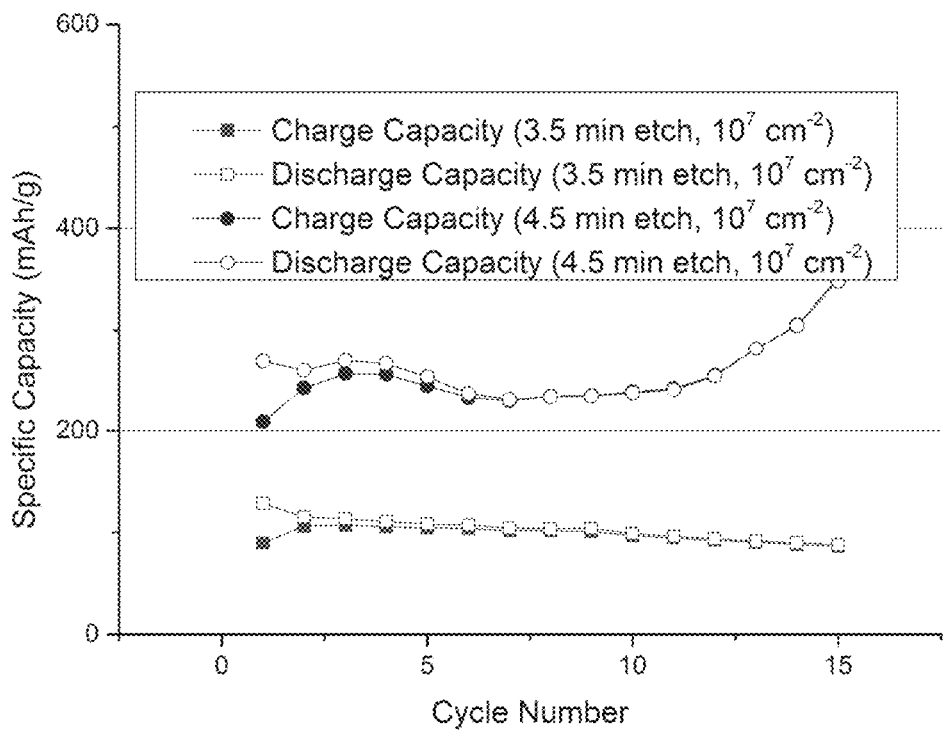
FIG. 5a and FIG. 5b compares the results of specific capacity (mAh/g), and of coulombic efficiency (%) as a function of cycle number for coin cells characterized by different pore size at a fluence of $10^7$ cm$^{-2}$.

FIG. 5a compares the results of specific capacity (mAh/g) (charge and discharge) as a function of cycle number, for a coin cell comprising a membrane M5 or M7 characterized by an immersion time of 3.5 min and 4.5 min (and thus nanochannels with an average pore diameter of about 115 nm and 161 nm), for a fluence (number of nanochannels/$cm^2$) of $10^7$ $cm^{-2}$.

Figure 5B:
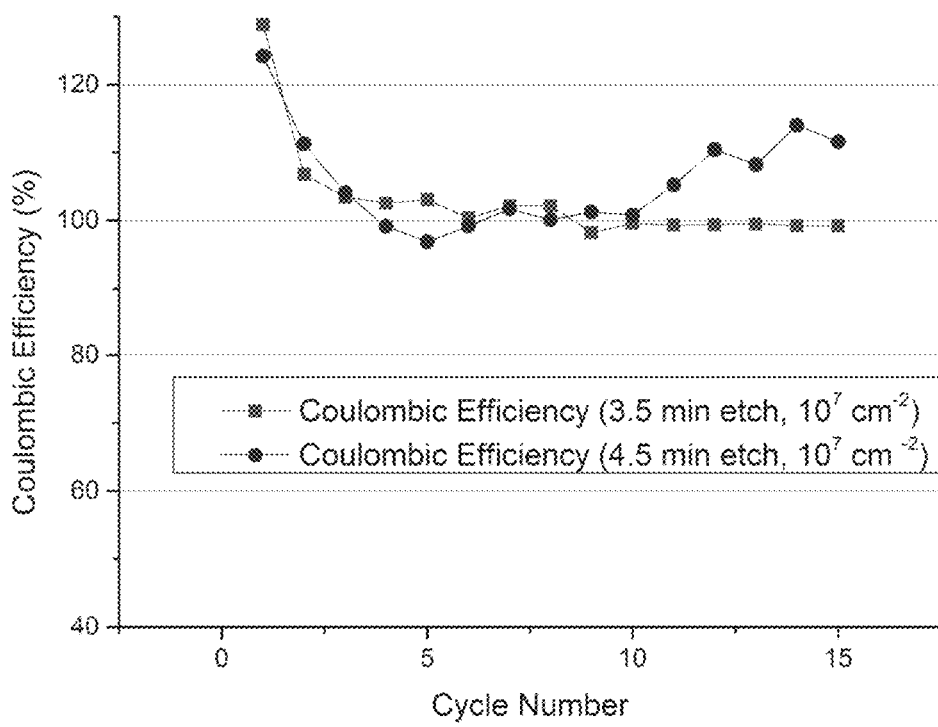

FIG. 5b compares the results of coulombic efficiency as a function of cycle number, for a coin cell comprising a membrane M5 or M7 characterized by an immersion time of 3.5 min and 4.5 min (and thus nanochannels with an average pore diameter of about 115 nm and 161 nm), for a fluence of $10^7$ $cm^{-2}$. The coulombic efficiencies of both batteries are very good.

Figure 6A:
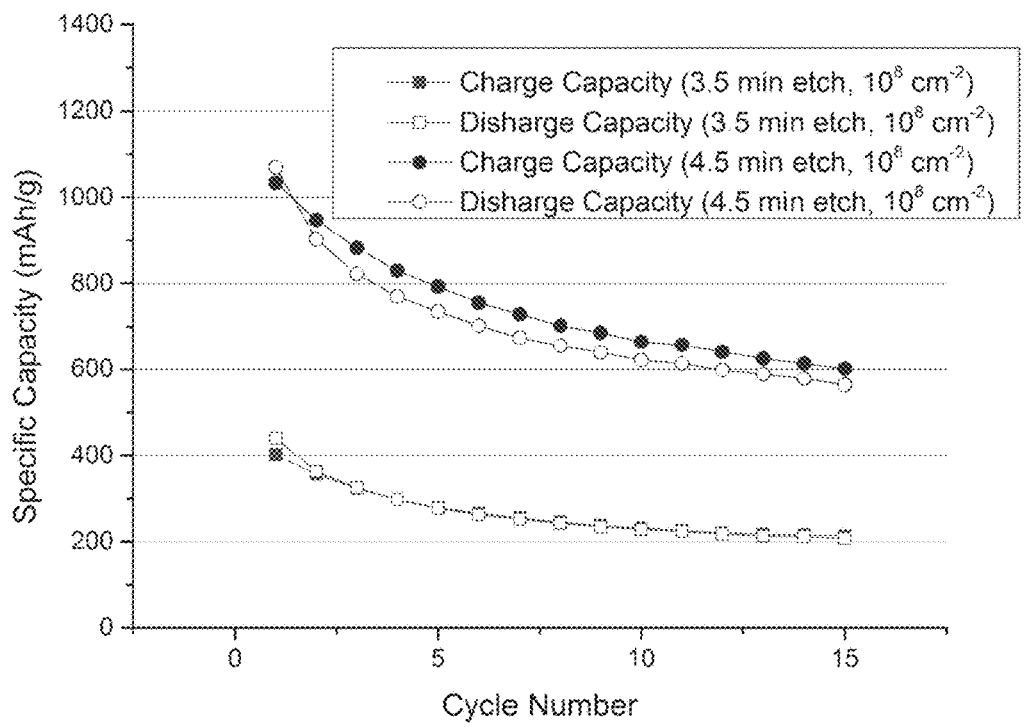
FIG. 6a and FIG. 6b compares the results of specific capacity (mAh/g), and of coulombic efficiency (%) as a function of cycle number for coin cells characterized by different pore size at a fluence of $10^8$ cm$^{-2}$.

FIG. 6a compares the results of specific capacity (mAh/g) (charge and discharge) as a function of cycle number, for a coin cell comprising a membrane M6 or M2 characterized by an immersion time of 3.5 min and 4.5 min (and thus nanochannels with an average pore diameter of about 115 nm and 161 nm), for a fluence of $10^8$ $cm^{-2}$.

Figure 6B:
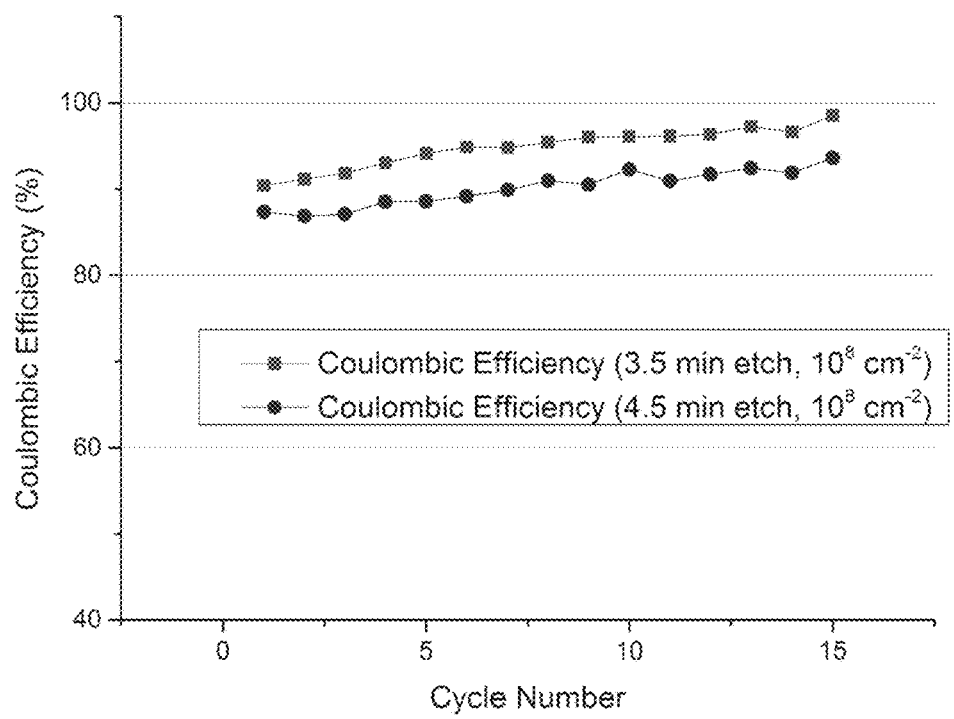

FIG. 6b compares the results of coulombic efficiency as a function of cycle number, for a coin cell comprising a membrane M6 or M2 characterized by an immersion time of 3.5 min and 4.5 min (and thus nanochannels with an average pore diameter of about 115 nm and 161 nm), for a fluence of $10^8$ $cm^{-2}$. Coulombic efficiencies obtained for both batteries are improved upon cycling compared that of the battery of reference B4 shown in FIG. 1.

Figure 7A:
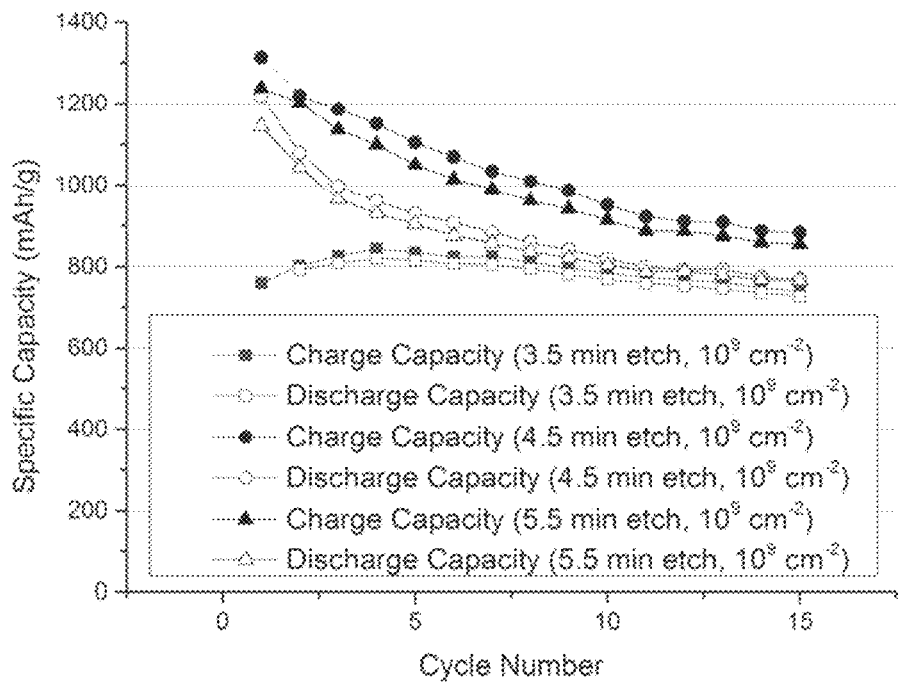
FIG. 7a and FIG. 7b compares the results of specific capacity (mAh/g), and of coulombic efficiency (%) as a function of cycle number for coin cells characterized by different pore size at a fluence of $10^9$ cm$^{-2}$.

FIG. 7a compares the results of specific capacity (mAh/g) (charge and discharge) as a function of cycle number, for a coin cell comprising a membrane M1, M8 or M9 characterized by an immersion time of 3.5 min, 4.5 min and 5.5 min (and thus nanochannels with an average pore diameter of about 115 nm, 161 nm and 198 nm), for a fluence of $10^9$ $cm^{-2}$.

Figure 7B:
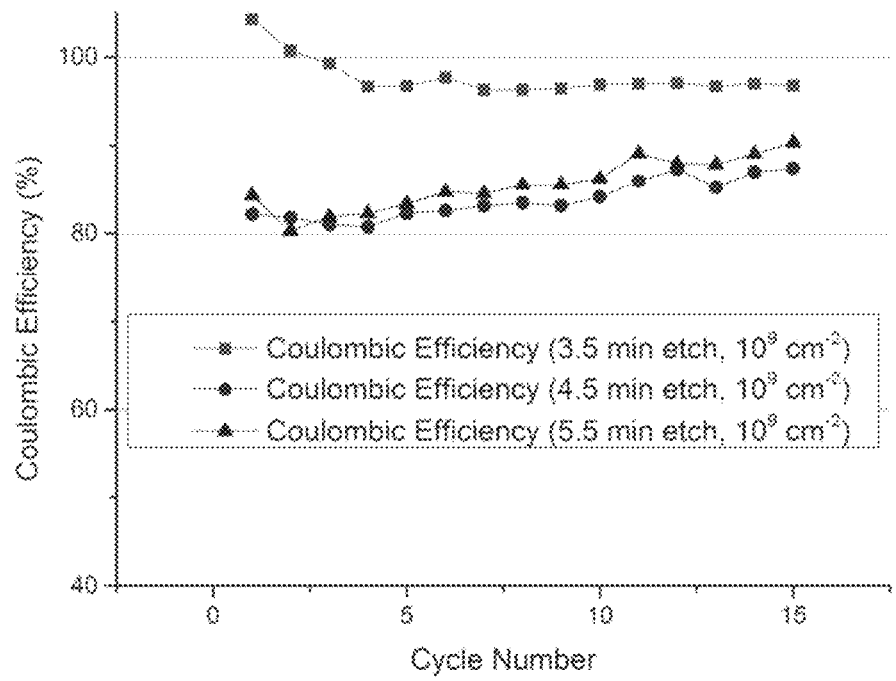

FIG. 7b compares the results of coulombic efficiency as a function of cycle number, for a coin cell comprising a membrane M1, M8 or M9 characterized by an immersion time of 3.5 min, 4.5 min and 5.5 min (and thus nanochannels with an average pore diameter of about 115 nm, 161 nm and 198 nm), for a fluence of $10^9$ $cm^{-2}$.

Figure 8A:
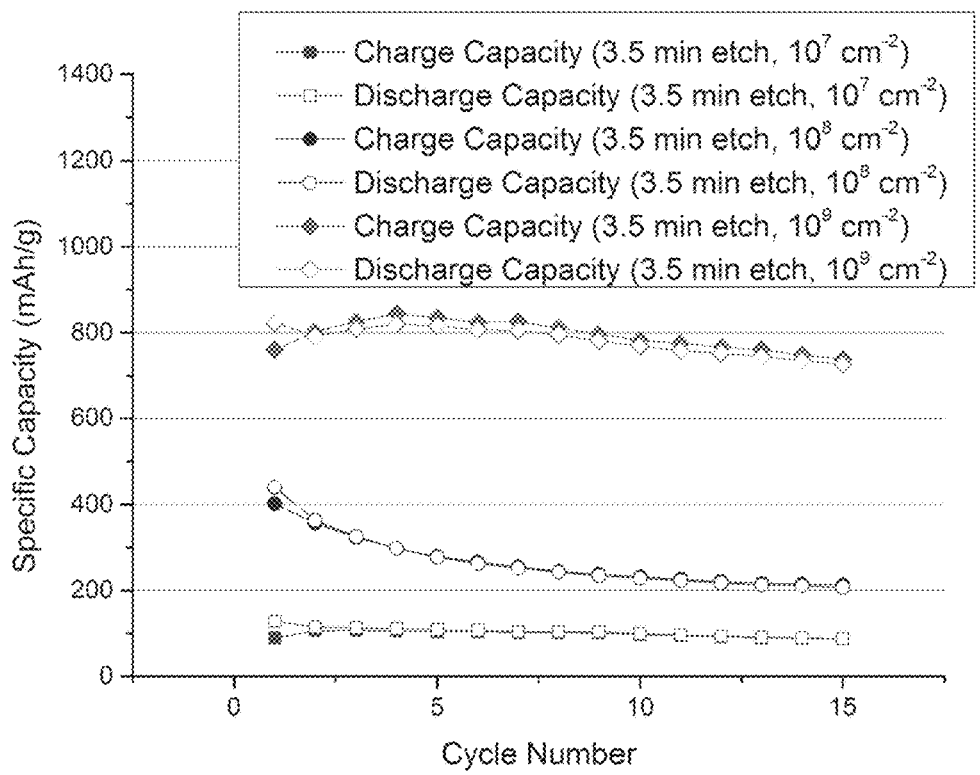
FIG. 8a and FIG. 8b compares the results of specific capacity (mAh/g), and of coulombic efficiency (%) as a function of cycle number for coin cells characterized by different fluences, and for an immersion time of 3.5 min.

FIG. 8a compares the results of specific capacity (mAh/g) (charge and discharge) as a function of cycle number, for a coin cell comprising a membrane M1, M5 or M6 characterized by an immersion time of 3.5 min (and thus nanochannels with an average pore diameter of about 115 nm), for a fluence of $10^7$, $10^8$, and $10^9$ $cm^{-2}$.

Figure 8B:
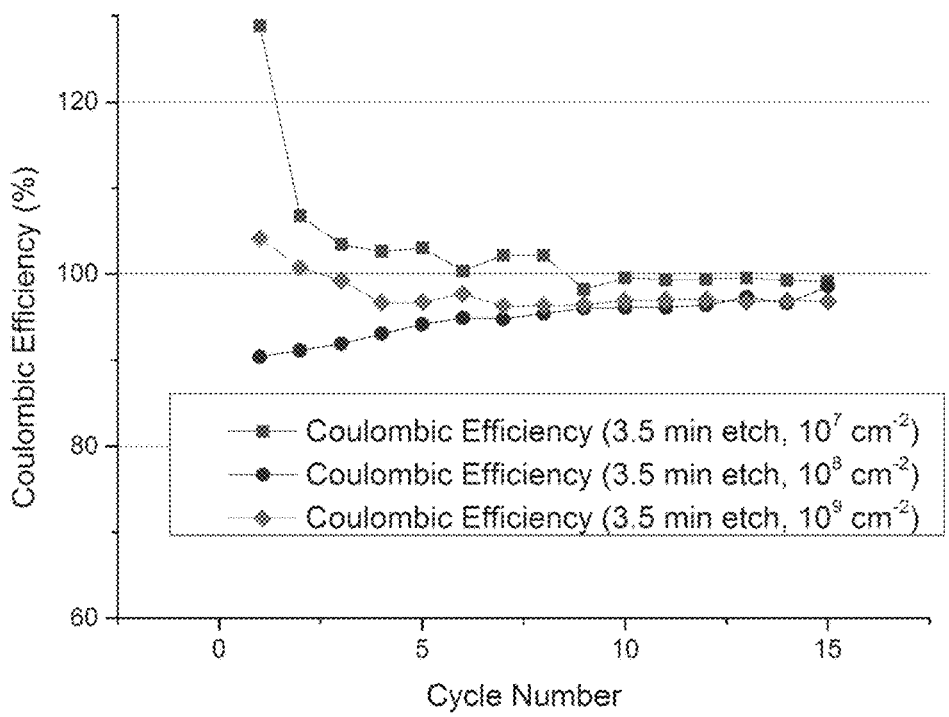

FIG. 8b compares the results of coulombic efficiency as a function of cycle number, for a coin cell comprising a membrane M1, M5 or M6 characterized by an immersion time of 3.5 min (and thus nanochannels with an average pore diameter of about 115 nm), for a fluence of $10^7$, $10^8$, and $10^9$ $cm^{-2}$.

Figure 9A:
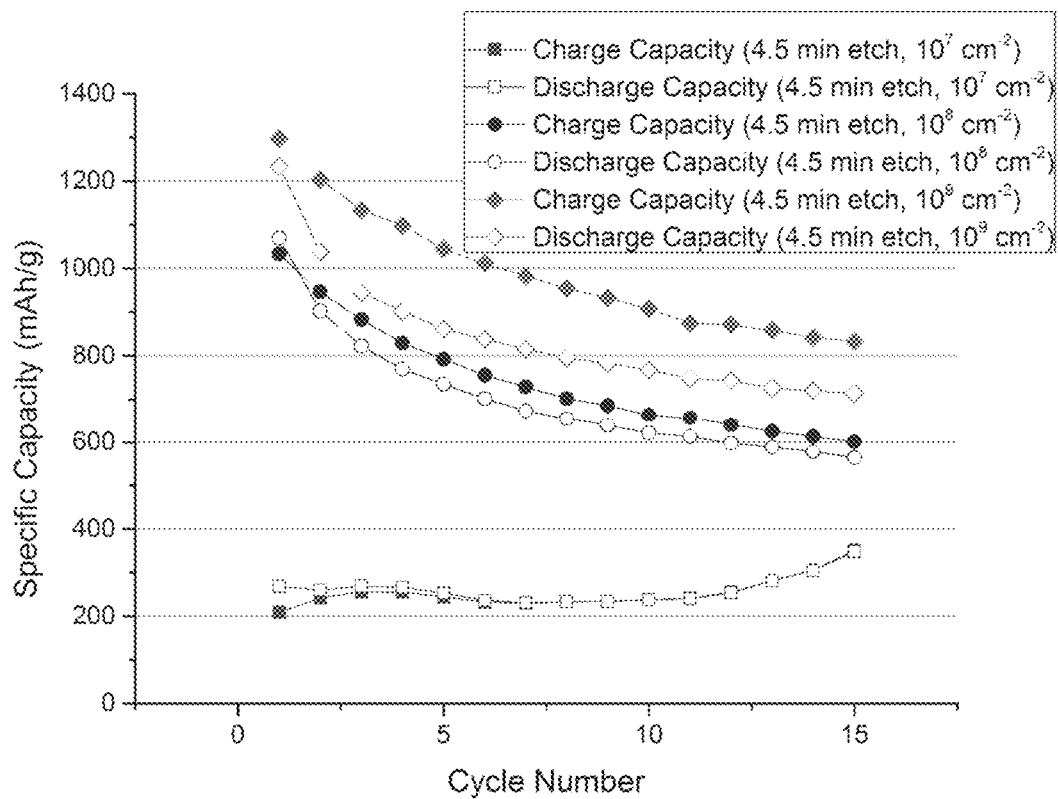
FIG. 9a and FIG. 9b compares the results of specific capacity (mAh/g), and of coulombic efficiency (%) as a function of cycle number for coin cells characterized by different fluences, and for an immersion time of 4.5 min.

FIG. 9a compares the results of specific capacity (mAh/g) (charge and discharge) as a function of cycle number, for a coin cell comprising a membrane M2, M7 or M8 characterized by an immersion time of 4.5 min (and thus nanochannels with an average pore diameter of about 161 nm), for a fluence of $10^7$, $10^8$, and $10^9$ cm$^{-2}$.

Figure 9B:
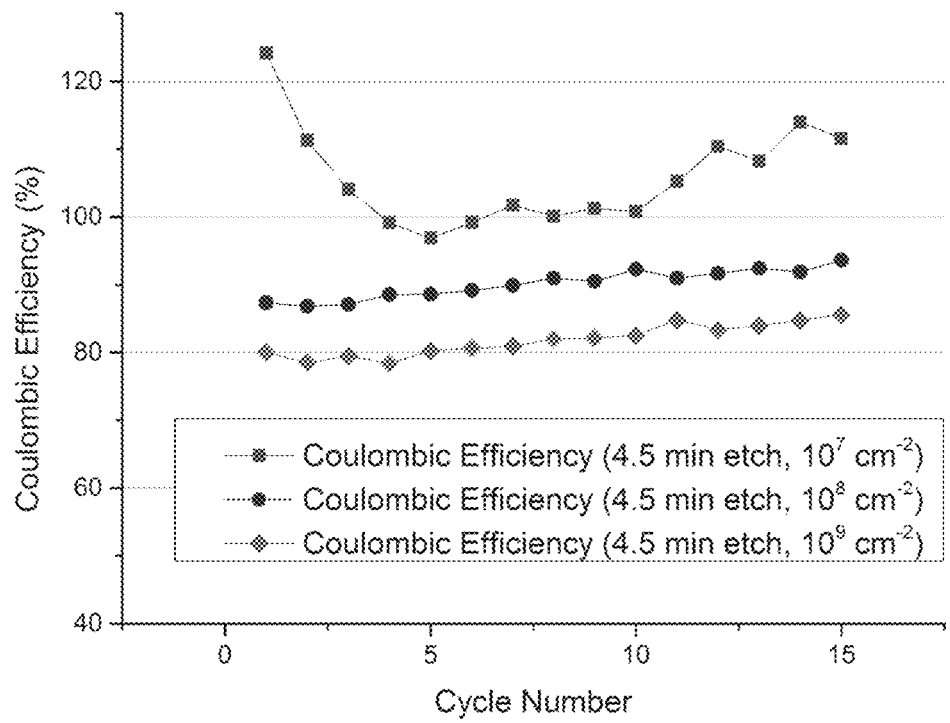

FIG. 9b compares the results of coulombic efficiency as a function of cycle number, for a coin cell comprising a membrane M2, M7 or M8 characterized by an immersion time of 4.5 min (and thus nanochannels with an average pore diameter of about 161 nm), for a fluence of $10^7$, $10^8$, and $10^9$ cm$^{-2}$.

From FIGS. 7a and 7b, 8a and 8b and 9a and 9b, the highest coulombic efficiency is that of B1 which comprises a membrane having an average pore diameter of about 115 nm with a fluence of $10^9$ cm$^{-2}$.

Example 4: Cycling Tests of Batteries Using Polymer Etched Ion-Track Membranes of the Present Invention with Conical Pores 4.1. Preparation of the Membranes and of the Coin Cells Membrane M10 was prepared based on the method described by Apel et al. (Nanotechnology 18 (2007) 305302). Briefly, a PET foil (thickness of 12 µm) was irradiated as described in Example 1 and exposed to UV light of 312 nm wavelength on both sides for 3 hours and subsequently clamped into a two chamber system maintained at 60° C. The two chambers are then filled simultaneously with 60° C. 6M NaOH solution containing a surfactant on one side, and 60° C. 6M NaOH without surfactant on the other. The chambers are then emptied after 3 minutes and washed with water. In the present example 0.05% (w/w) of a concentrated (about 45%) aqueous solution of sodium dodecyl diphenyloxide disulfonate was used as surfactant.

Membranes produced in this way comprises nanochannels with opening diameter of about 20 nm to 50 nm on one side and about 150 nm to 300 nm on the other side of the membrane. Membrane M10 had an opening tip diameter of about 20 nm on one side and an opening tip diameter of about 200 nm on the other side. Since especially very small opening tip diameters are difficult to determine precisely, these opening tip diameters might vary by +/−10-15%.

Other methods to prepare etched ion-track membranes with conical pores or pores that have an opening tip diameter that is bigger on one side than on the other are known in the art and can equally be used.

Coin cells were prepared as described in example 2.

4.2. Battery Cycling Tests

The cell comprises 20 µl of electrolyte per mg of active material, and thus 10 µl of electrolyte per cell. The batteries were tested FIG. 10a gives the results of specific capacity (mAh/g) (charge and discharge) and coulombic efficiency as a function of cycle number, for a coin cell comprising conical pores.

Figure 10A:
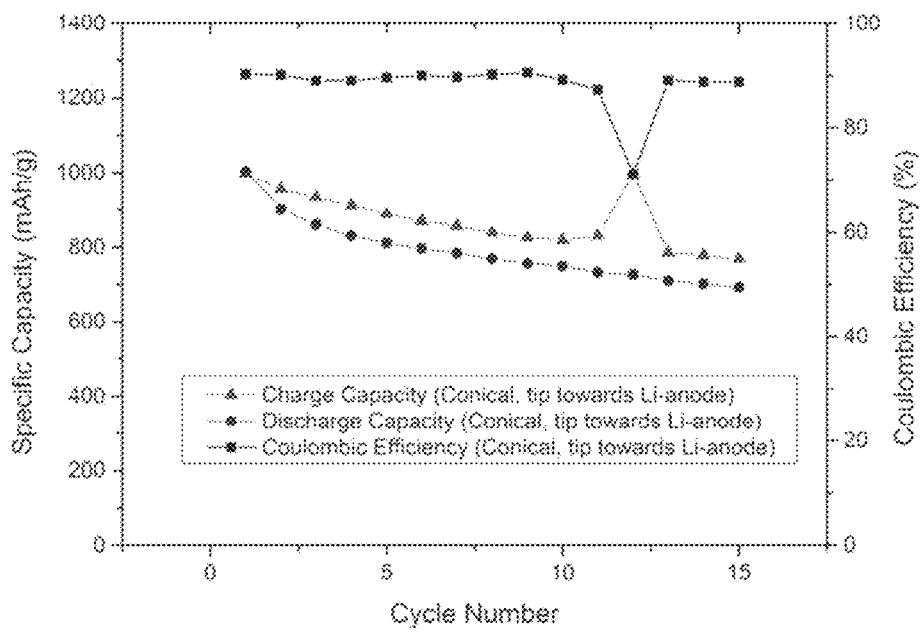
FIG. 10a and FIG. 10b gives the results of specific capacity (mAh/g), and of coulombic efficiency (%) as a function of cycle number for a coin cell characterized by membrane having conical pores.
Figure 10B:
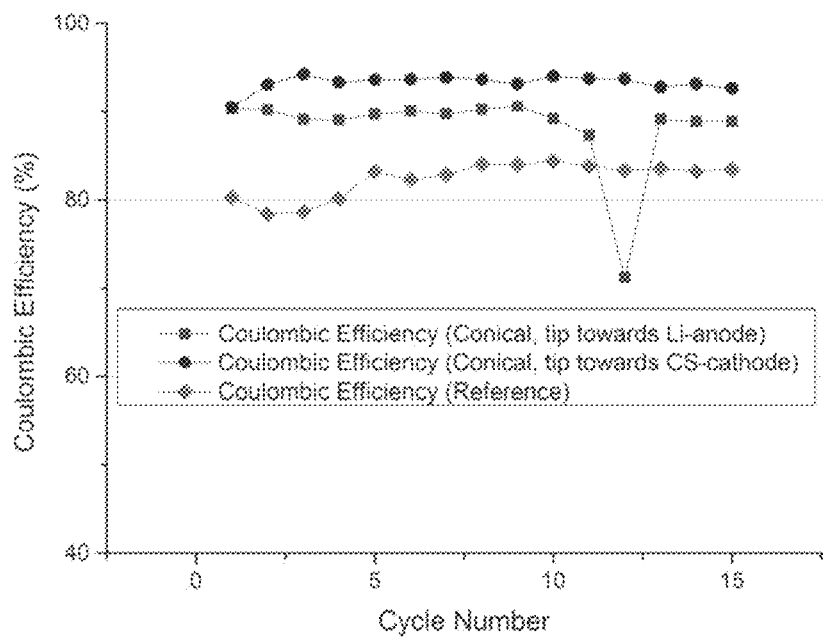

FIG. 10b gives the results of coulombic efficiency as a function of cycle number, for a coin cell comprising conical pores in different configurations.

From FIG. 10a and FIG. 10b capacity and capacity retention of the cell with the membrane is comparable with the reference electrode whereas a very good coulombic efficiency close to 100% is measured with our membrane showing suppression of polysulfides redox shuttle.

The invention claimed is:

1. A lithium-sulfur battery comprising:
a separator comprising a porous polymer etched ion track membrane;
at least one positive electrode, at least one negative electrode and at least one liquid electrolyte comprising at least one salt of a cationic ion selected in the group consisting of lithium, sodium, potassium and calcium in solution in at least one solvent, wherein:
said polymer is selected from the group comprising polyethyleneterephtalate (PET), polycarbonate (PC), polyethylene (PE), polypropylene (PP), polyimide (PI) polytetrafluoroethylene (PTFE), and polyvinylidene fluoride (PVdF),
said membrane has a frontside, a backside, and a thickness,
the frontside of said membrane is designed to face the positive electrode,
the backside of said membrane is designed to face the negative electrode,
the thickness of said membrane between said frontside and said backside is ranging from 5 to 60 µm,
said membrane comprises a plurality of nanochannels,
the majority in number of said nanochannels is continuous and has an opening tip at the frontside and an opening tip at the backside of said membrane,
the opening tip diameter of each of said nanochannels at the frontside of said membrane ($D_{FS}$) ranges from 115 to 161 nm.

2. The lithium-sulfur battery according to claim 1, wherein:
thickness of said membrane ranges from 5 to 30 µm; and/or
the opening tip diameter of each of said nanochannels at the backside of the membrane ($D_{BS}$) ranges from 10 nm to 600 nm.

3. The lithium-sulfur battery according to claim 1, wherein the opening tip diameter of each of said nanochannels at the backside of the membrane ($D_{BS}$) is identical to the opening tip diameter of each of said nanochannels at the frontside of the membrane ($D_{FS}$).

4. The lithium-sulfur battery according to claim 3, wherein said nanochannels have a cylindric shape and their longitudinal axis are parallel oriented to one another.

5. The lithium-sulfur battery according to claim 3, wherein said nanochannels are interconnected.

6. The lithium-sulfur battery according to claim 1, wherein the opening tip diameter of each of said nanochannels at the backside of the membrane ($D_{BS}$) is greater or smaller than the opening tip diameter of each of said nanochannels at the frontside of the membrane ($D_{FS}$) and ranges from 10 to 600 nm.

7. The lithium-sulfur battery according to claim 6, wherein said nanochannels have a conical shape and their longitudinal axis are parallel oriented to one another.

8. The lithium-sulfur battery according to claim 1, wherein the said polymer is polyethyleneterephtalate.

9. The lithium-sulfur battery according claim 1, wherein the ratio of the total volume of the nanochannels/total volume of the membrane ranges from 2 to 50%.

10. The lithium-sulfur battery according to claim 1, wherein the nanochannels density in said membrane ranges from to $10^6$ to $10^{12}$ nanochannels/cm$^2$.

11. The lithium-sulfur battery according to claim 1, wherein at least one of the surfaces of the porous membrane comprises a coating of at least one layer of oxide of a metal or of a metalloid.

12. The lithium-sulfur battery according to claim 11, wherein said at least one surface is the surface designed to face the positive electrode.

13. The lithium-sulfur battery according to claim 11, wherein said layer is a layer of $TiO_2$, $SiO_2$ or $Al_2O_3$.

14. The lithium-sulfur battery according to claim 1, wherein the opening tip diameters of the nanochannels on the front side of the membrane have a distribution within a variance range of ±0-10%, and the opening tip diameters of the nanochannels on the back side of the membrane have a distribution within a variance range of ±0-10%.

15. The lithium-sulfur battery according to claim 1, wherein the opening tip diameters of the nanochannels on the front side of the membrane have a distribution within a variance range of ±0-5%, and the opening tip diameters of the nanochannels on the back side of the membrane have a distribution within a variance range of ±0-5%.

* * * * *